(No Model.)
H. WESTPHAL.
SAW.
No. 251,149. Patented Dec. 20, 1881.
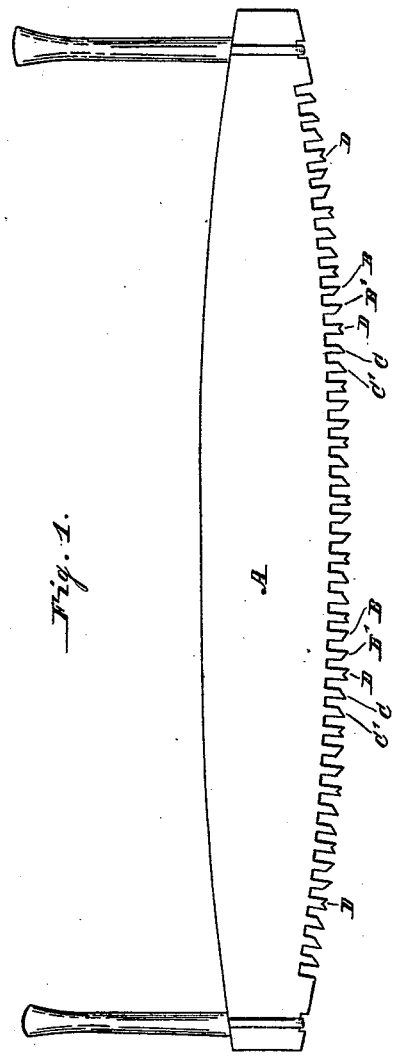
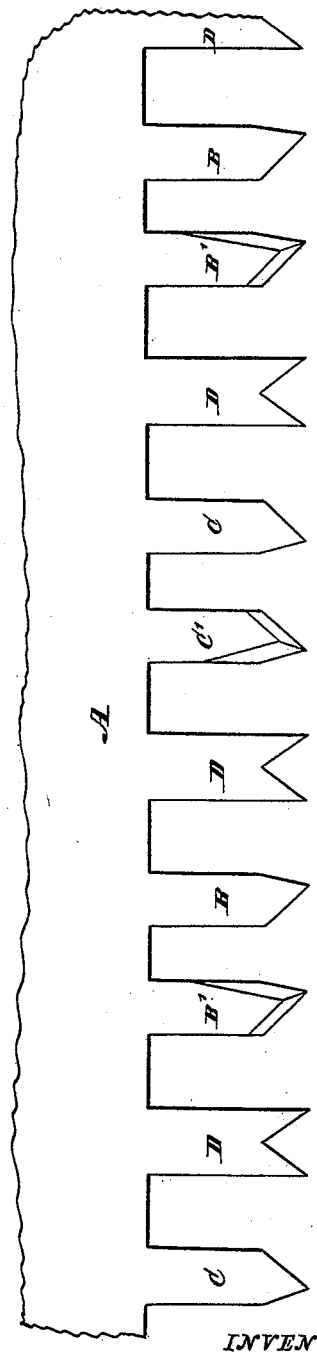
WITNESSES.
James B. Lijius
R. P. Daggett.
INVENTOR.
Henry Westphal,
per
C. Bradford
ATTORNEY.

United States Patent Office.

HENRY WESTPHAL, OF INDIANAPOLIS, INDIANA.

SAW.

SPECIFICATION forming part of Letters Patent No. 251,149, dated December 20, 1881.

Application filed September 12, 1881. (No model.)

*To all whom it may concern:*

Be it known that I, HENRY WESTPHAL, of the city of Indianapolis, county of Marion, and State of Indiana, have invented certain new and useful Improvements in Saws, of which the following is a specification.

The object of my said invention is to produce a crosscut-saw which shall cut more rapidly and with a less expenditure of strength than those whereon the teeth are formed and arranged in the ordinary manner.

It consists in arranging the cutting-teeth in sets, the alternate sets being formed to cut in opposite directions, and providing the usual clearing-teeth between the sets of cutting-teeth, as will hereinafter be specifically set forth.

Referring to the accompanying drawings, which are made a part hereof, and on which similar letters of reference indicate similar parts, Figure 1 is a side view of a saw embodying my invention, and Fig. 2 is a detail view, on an enlarged scale, of a portion of the saw-plate and several teeth thereon, showing more exactly the form and arrangement of said teeth.

In said drawings, the portions marked A represent the body of the saw-blade, which is of the usual form; B B', the teeth of the sets which cut when the saw is moving to the right; C C', the teeth which cut when the saw is moving toward the left, and D the clearing-teeth. The teeth marked B C appear, when seen from the opposite side of the saw, as those marked B' C' do in the view shown.

In order to give a clear understanding of my invention, it may be necessary to state that I have demonstrated that in the use of a saw wherein all the cutting-teeth operate while moving in each direction the teeth are capable of cutting more sawdust than can be successfully thrown out, and thus are forced to operate on the sawdust already cut for a portion of the stroke. This, as will be readily seen, is a great waste of power. In my invention but one-half the cutting-teeth are in operation at a time, which I have found to be amply sufficient, and the others simply follow in the path cut thereby. This saves a considerable percentage of power, and not only does not operate to retard the speed of the work, but I have demonstrated by actual competition with the best makes of saws not possessing my improvements that the work is even more speedily accomplished. This is due to the fact that a better cutting-edge can be made upon one side of a tooth than upon both, as where both are sharpened to cut the angle is necessarily greater than that shown, and which I have found to be best, unless the teeth are made exceedingly slim, in which case they will not wear well, and the gain is thus more than destroyed by the time taken for frequent sharpening.

I am fully aware that saws have been constructed wherein sets of cutting-teeth and clearing-teeth were alternated, and I therefore confine myself in my claim to a saw wherein a part of the cutting-teeth cut when the saw is moving in one direction and the others when the saw is moving in the other direction, and in which those which cut in the one case do not cut much, if any, in the other case, or at least cut comparatively little.

Having thus fully described my said invention, what I claim as new, and desire to secure by Letters Patent, is—

A crosscut-saw having its cutting-teeth arranged in sets, with a clearing-tooth between each set, one set, B B', being sharpened in the form shown to cut in one direction, the other set, C C', being sharpened in like manner to cut in the other direction, and the clearing-teeth D, being the M-shaped teeth ordinarily used in such saws, all substantially as shown and described, and for the purpose specified.

In witness whereof I have hereunto set my hand and seal, at Indianapolis, Indiana, this 8th day of September, A. D. 1881.

HENRY WESTPHAL. [L. S.]

In presence of—
C. BRADFORD,
CHARLES BOICOURT.